United States Patent [19]

Uchida

[11] Patent Number: 5,067,573

[45] Date of Patent: Nov. 26, 1991

[54] HAND-WRITING INPUT APPARATUS

[75] Inventor: Hiroshi Uchida, Kanagawa, Japan

[73] Assignee: Sony Corporation, Tokyo, Japan

[21] Appl. No.: 633,666

[22] Filed: Dec. 26, 1990

[30] Foreign Application Priority Data

Dec. 27, 1989 [JP] Japan .................................. 1-344626

[51] Int. Cl.⁵ ............................................. G08C 21/00
[52] U.S. Cl. ......................................... 178/18; 382/69
[58] Field of Search ................. 178/18, 19, 20; 382/1, 382/69

[56] References Cited

U.S. PATENT DOCUMENTS

| 4,927,986 | 5/1990 | Daly | 178/18 |
| 4,973,900 | 11/1990 | Sindeband et al. | 178/18 |
| 4,988,836 | 1/1991 | Murray | 178/18 |

Primary Examiner—Stafford D. Schreyer
Attorney, Agent, or Firm—Hill, Van Santen, Steadman & Simpson

[57] ABSTRACT

An electronic tablet which receives handwritten input via an input pen, including a receptacle for the pen and a detector operative to detect the presence of the pen in the receptacle. Preferably, a warning signal generator is also provided to generate, at appropriate times, a warning signal indicating absence of the pen from the receptacle.

16 Claims, 11 Drawing Sheets

HAND-WRITING INPUT APPARATUS

BACKGROUND OF THE INVENTION

The present invention relates to apparatus for processing handwriting inputs, e.g., an electronic tablet. More particularly, the invention relates to apparatus for processing handwriting inputs generated via cordless input pens.

Handwriting input processors are of various types known, among others, as electronic notebooks, keyboardless computers, drawing terminals, digitizing tablets, etc. Generally a planar input surface is provided (hereinafter referred to as a "tablet". The tablet includes some sort of matrix of electrode lines so that contacting of a pen tip to the surface of the tablet can be tracked via association with coordinates relating to every point of contact. By analyzing the coordinates associated with one or more points of contact, a handwritten input can be processed.

Heretofore, the point of contact between the pen tip and the tablet has been recognized via various methods. Among these methods are electromagnetic coupling, resistance change detection, and the like. With methods such as these, there is no need to additionally connect the input pen to a signal processing circuit and thus, the pen is not tethered. As a result, the user is free to pick up a pen and use it with high efficiency.

However, because the pen is not tethered, it can become lost. While in some cases alternate pens can be used, generally specially designed pens must be used. Thus, the loss of the pen can render the tablet useless unless another pen is obtained. Further, even if an alternate pen can be used, the difference in pen tips might be detrimental to the tablet surface thereby damaging the tablet.

Of course, to prevent loss of a pen it could be tethered to the tablet. However, tethering the pen limits its freedom and can lessen the efficiency of its use.

SUMMARY OF THE INVENTION

The present invention provides a handwriting input apparatus with an untethered pen whose loss is prevented or discouraged. To this end, the invention provides a receptacle for such a pen and means for detecting the absence of the pen from the receptacle under appropriate circumstances.

In one embodiment, the invention provides a tablet wherein a tablet body is provided with a receptacle for an input pen, a detector associated with the receptacle that detects presence of the pen in the receptacle, and a warning device operative to warn a user that the pen is not received within the receptacle whenever the tablet is not in use.

These and other features and aspects of the invention will become clear with reference to the following detailed description of the presently preferred embodiments and accompanying drawings.

BRIEF DESCRIPTION OF THE DRAWINGS

FIGS. 8A and 8B illustrate another handwriting input apparatus made in accordance with the invention.

FIGS. 9A and 9B illustrate a third handwriting input apparatus made in accordance with the invention.

DETAILED DESCRIPTION OF THE PRESENTLY PREFERRED EMBODIMENTS

Figure 1:
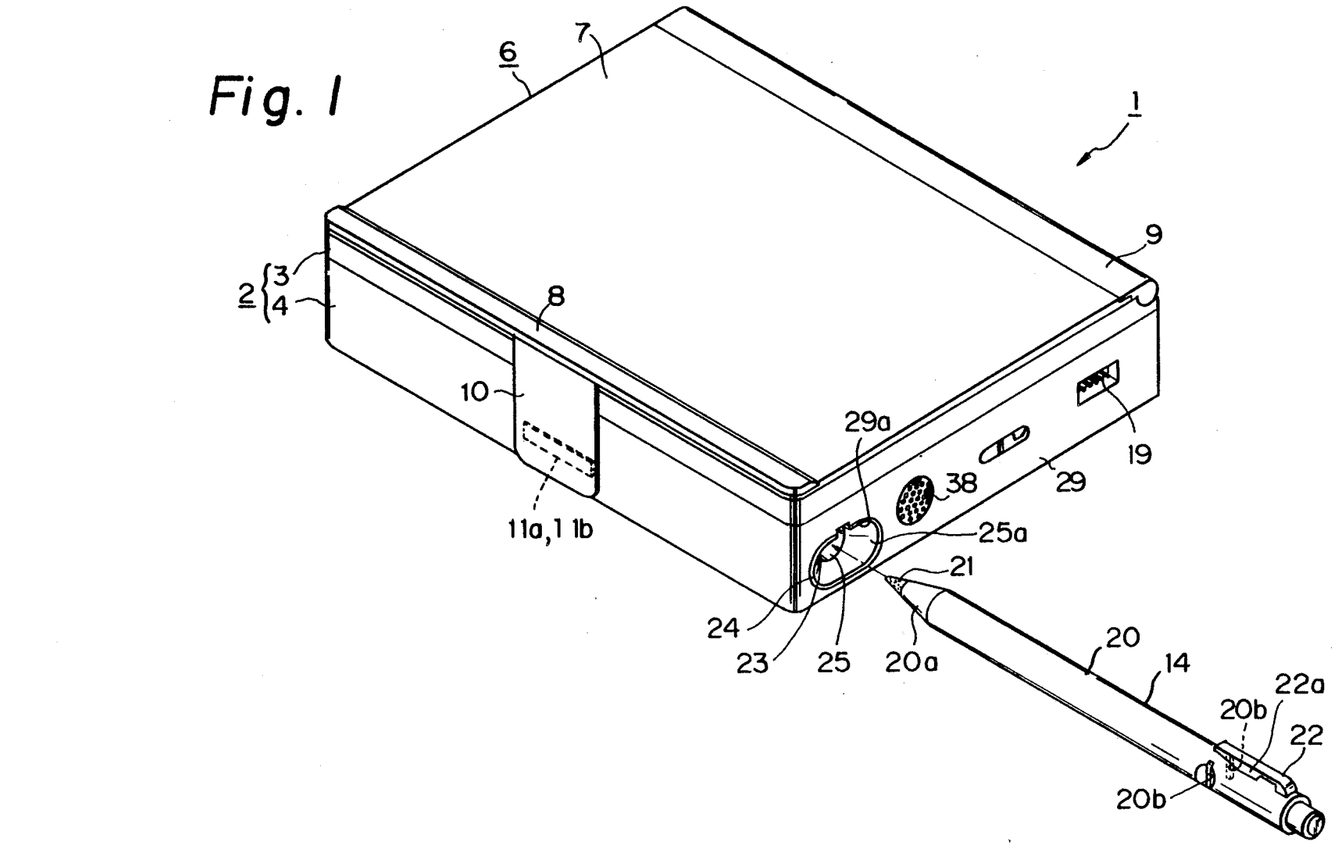
FIG. 1 is a perspective view of a tablet in which its input surface is covered by a cover member and an input pen is removed from its receptacle.
Figure 2:
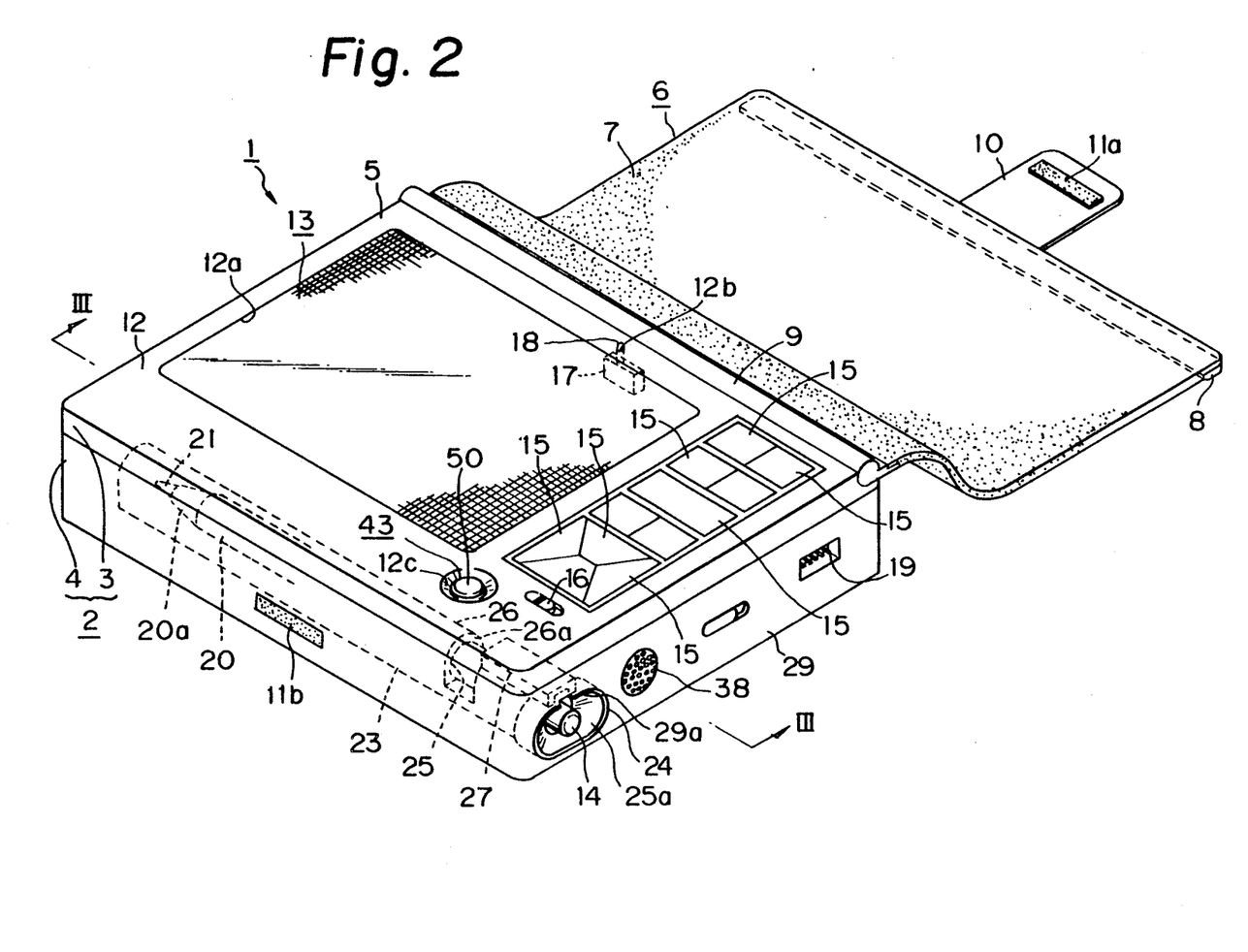
FIG. 2 is a perspective view of the table of FIG. 1 in which its input surface is exposed and the input pen is received within its receptacle.

In FIGS. 1 and 2 there is illustrated a handwriting input apparatus 1 that can be referred to as an electronic notebook, tablet, or slate. As illustrated, the electronic tablet 1 comprises a case or housing 2 substantially having a rectangular box-shape. The case 2 is formed by suitable joining together of upper and lower case halves 3 and 4, respectively.

An upper surface 5 on the tablet 1 is referred to as the operating surface through which handwritten information is input into the tablet 1. The input surface 5 can be covered by a removable cover 6 that is freely opened or closed. The cover 6 comprises a main portion 7 preferably made of a rubber plate and a reinforcing plate fixed to a front edge of the main portion 7.

A hinge member 9 serves to hingedly secure the cover 6 to a top edge of the case 2. Thus, the main portion 7 is movable between an open lid position wherein the operating surface is exposed, as illustrated in FIG. 2, and a closed lid position wherein the main portion 7 overlays and covers the operating surface, as illustrated in FIG. 1.

Provided along a front edge portion of the cover 6 is a band or flap 10. One end of the band 10 is secured to the reinforcing plate 8. Another free end is provided with one member 11a of a face fastener. A cooperating face fastener member 11b is secured to the case 2 so that the cover can be secured in its closed position by appropriate overlaying of the face fastener members 11A and 11B. It can be appreciated that the face fastener members 11A and 11B can comprise the cooperating members of suitable hook and loop fasteners, commonly sold under the trademark VELCRO.

Reference numeral 12 denotes an upper surface wall of the upper half 3 and 12a denotes an opening of a size adapted to occupy most of the region of the upper surface wall 12. A liquid crystal tablet panel 13 is appropriately fitted into the tablet opening hole 12A. The liquid crystal tablet panel 13 is formed by, for example, overlaying a transparent tablet onto a liquid crystal display panel. The panel 13 is operative to receive handwritten information input, i.e, operation over the like, by use of an appropriate input pen 14. Further, the panel 13 displays information as needed.

Reference numerals 15 denote operating buttons arranged along the right-hand side of the liquid crystal tablet panel 13, on the operating surface 5 thereof.

Reference numeral 16 denotes a power button employed to operate a power switch (not illustrated). The power button 16 is disposed on the operating surface 5 and is moved between a position to turn on a power source and a position to turn off the power source.

A separate shut-off switch 17 is disposed along a rear edge portion of the case 2. The switch 17 is provided with a pin-shaped element 18 that extends through a hole 12b formed in the upper surface 12 so as to protrude therefrom. The pin shaped element 18 is located so as to be contacted by the cover 6 when the cover 6 is placed in its closed position. Thus, when the cover 6 is placed in its closed position, the pin element 18 is depressed and the switch 17 shuts off the power source regardless of the position of the power button 16.

Reference numeral 19 denotes an input/output connector for appropriate connection of the notebook 1 with an external apparatus. As illustrated, the connector 19 preferably comprises a pin connector.

It can be appreciated that the tablet 1 includes a suitable display circuit and a suitable input circuit for operation of the tablet panel 13. Similarly, within the case 2, there are provided a calculation control section, a memory section, and various interfaces and the like, as needed.

The input pen 14 has a length which is slightly shorter than a length in the lateral direction of the case 2. Accordingly, the length of the input pen 14 is shorter than the length along the front edge of the case 2.

Reference numeral 20 denotes a main portion of the input pen 14 which has a cylindrical shape. An end portion 20a is conically shaped and is secured to one axial end of the main portion 20. A pen tip 21 is appropriately attached so as to project from the tip of the end portion 20a (hereinafter referred to as the conical portion). On the other axial end of the main portion 20, a clip 22 is attached thereto. The clip 22 has parallel side walls 22a.

Figure 3:
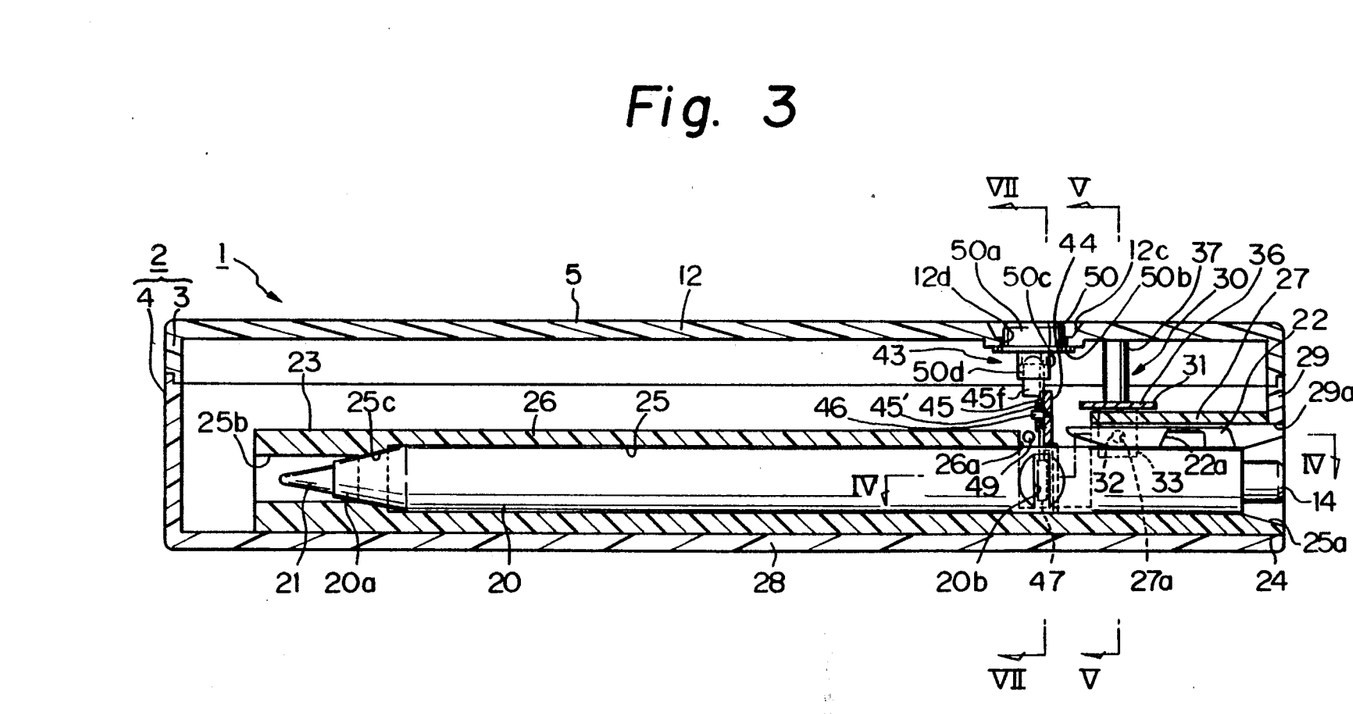
FIG. 3 is an enlarged cross-sectional view taken along the line III—III in FIG. 2.

The main cylindrical portion 20 is also provided with engaging grooves 20b which extend in a direction perpendicular to the axial direction of the main portion 20. The engaging grooves 20b are formed at two positions on opposite sides of the main portion 20 on a position close to the clip 22. The engaging grooves 20b are provided to prevent release of the input pen 14 from the case 2 in a manner which will be described below.

As illustrated, the case 2 is provided with a pen receptacle 23 within which is accommodated the input pen 14. The pen receptacle 23 is disposed along a front edge portion of the case 2 and extends between two lateral faces of the case 2.

The pen receptacle 23 preferably comprises a unitary member formed of a synthetic resin. The receptacle 23 is formed to have a length substantially as long as that of the pen 14.

As illustrated, the receptacle 23 is a substantially cylindrical member having a substantially cylindrical bore 25 extending therethrough. One edge 24 of the receptacle 23 is secured to one lateral face of the case 2. The edge is shaped to be substantially elliptical for reasons that will become clearer below. As illustrated, a wall 25a extending from the edge 24 to the cylindrical bore 25 is curved so as to taper from the edge 24 to an edge of the bore 25.

As illustrated best in FIG. 3, the bore 25 preferably is shaped to have an end portion 25b, within which is accommodated the tip 21 of the pen 14, which has a diameter smaller than that portion of the bore 25, within which is accommodated the main cylindrical portion 20 of the pen 14. A tapering bore 25c extends between the bore portion 25B and the main portion of the bore 25. As such, the bore 25 conforms in shape about the pen 14.

Figure 4:
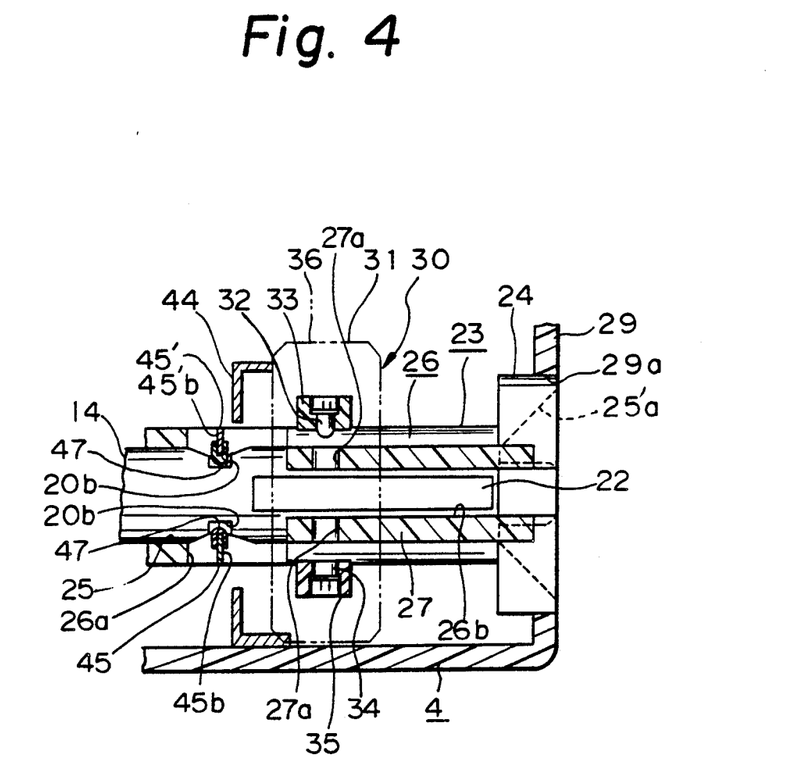
FIG. 4 is a cross-sectional view taken along the line IV—IV in FIG. 3.
Figure 5:
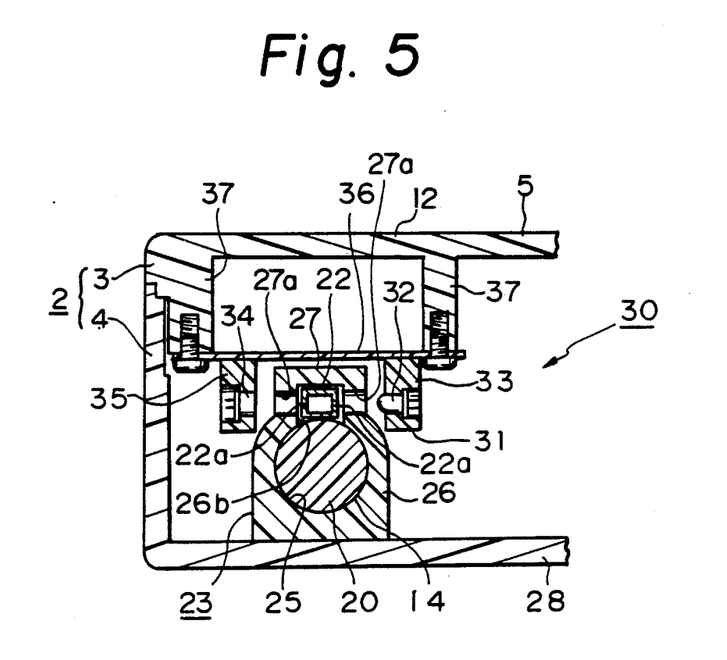
FIG. 5 is a cross-sectional view taken along the line V—V in FIG. 3.

A notch 26a having an almost inverse U-shape when viewed in cross-sectional view is formed in a portion of the receptacle 23 closer to the right edge 24. The notch 26a is formed by cutting out a portion of the peripheral wall of the receptacle 23, other than the bottom portion. Further, a notch groove 26b which extends in a longitudinal direction of the pen receptacle 23 is formed in the vertex portion of the right-hand side portion from the notch 26a of the peripheral wall 26. The notch groove 26b is covered by a projecting portion 27 having a U-shape whose cross-sectional shape is open toward the lower position.

An attaching portion (not shown) which is initially formed with the pen receptacle 23 is secured to the front edge portion of the upper surface of a bottom surface wall 28 of the lower half 4, so that the receptacle 23 is disposed in the front edge portion in the box 2. On the other end, the right edge portion 24 is fitted into a hole 29a formed in a right side wall 29 of the lower half 4, so that the right edge portion 25a of the hole 25 opens toward the outer surface of the right side wall 29

When the input pen 14 is received in the pen receptacle 23, the clip 22 is disposed along the top of the pen 14 and the pen tip 22 is directed to the left side of the case 2, as illustrated in FIG. 1.

When the input pen 14 is inserted into the hole 25 of the pen receptacle 23 in the manner mentioned above, the further insertion of the input pen 14 is blocked at a position where the conical portion 20a of the input pen 14 fits into the tapered portion 25c of the hole 25, as shown in FIG. 3. In this position, the right edge surface of the main portion 20 of the input pen 14 is located on substantially the same plane as the outer surface of the right side wall 29 of the lower half 4.

After the input pen 14 is received into the pen receptacle 23 as mentioned above, the clip 22 is positioned within the projecting portion 27 of the pen receptacle 23 and the engaging grooves 20b are located at positioned in registry with the notch 26a formed on the peripheral wall 26.

Holes or translucent portions 27a are formed in both the front and rear side walls of the projecting portion 27 which face the side walls 22a of the clip 22, when the input pen 14 is received in the receptacle 23.

Reference numeral 30 denotes a pen loss preventing mechanism to prevent the loss of the input pen 14. The mechanism 30 comprises: a photo interrupter which outputs different signals in depending on whether or not the input pen 14 is placed with the pen receptacle 23; a buzzer; a warning circuit to drive the buzzer when a signal indicating that the input pen 14 is not placed within the receptacle 23 is output by the photo interrupter and a power source is shut off or the cover 6 is in its closed position; and the like.

In FIGS. 3, 4, and 5, reference numeral 31 denotes a photo interrupter. The photo interrupter 31 comprises: a supporting member 33 which supports a light emitting device 32; a supporting member 35 which supports a photo sensitive device 34; and a circuit board 36 to which the supporting members 33 and 35 are attached. The circuit board 36 is fixed to attaching bosses 37 which are vertically formed on the upper surface wall 12 of the upper half 3. The supporting members 33 and 35 are attached to the lower surface of the circuit board 36 in a manner such that the light emitting device 32 and the photo sensitive device 34 face each other and are separated by a predetermined distance in the front/rear direction.

When the upper half 3 and the lower half 4 are joined together, the light emitting device 32 and the photo sensitive device 34 are positioned so as to face through the projecting portion 27 of the pen enclosing casing 23 in registry with the holes or translucent portions 27a. Therefore, when the input pen 14 is not received in the pen receptacle 23, the light emitted from the light emitting device 32 is irradiated onto the photo sensitive device 34 through the holes or translucent portion 27a. However, when the input pen 14 is received in the pen receptacle 23, the light irradiation to the photo sensitive device 34 is obstructed by the side walls 22a of the clip 22. Different signals are output by the photo sensitive device 34 when the input pen 14 has been received in the pen receptacle 23 and when the pen 14 is not so received.

In the following description, the signal which is output by the photo sensitive device 34 when the input pen is not received in the pen receptacle 23 is referred to as an "ON signal" and the signal which is output by the photo sensitive device 34 when the input pen 14 has been received in the receptacle 23 is referred to as an "OFF" signal.

Figure 6:
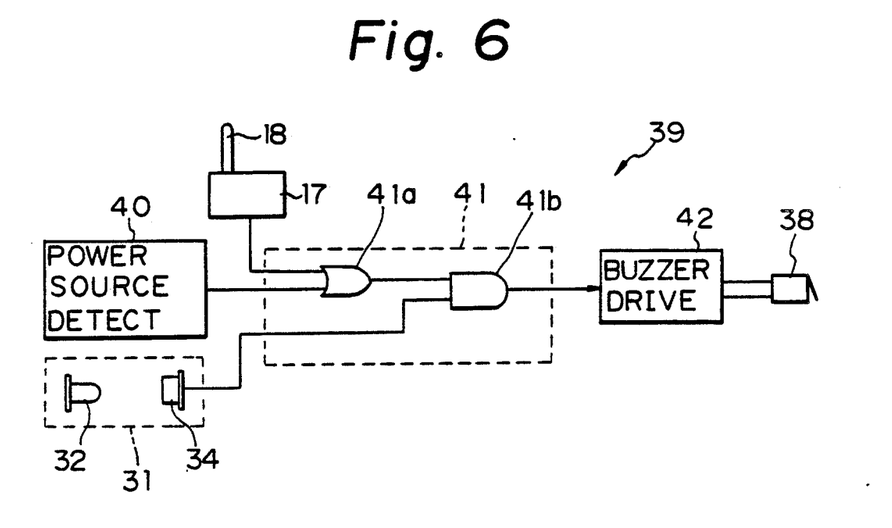
FIG. 6 is a block diagram of a warning circuit.

Buzzer and warning circuits are illustrated in FIG. 6.

Reference numeral 38 denotes a buzzer which is attached to the right side wall 29 of the lower half 4. Reference numeral 39 denotes a warning circuit comprising: power source detecting means 40 for detecting that the power source was shut off; a judging circuit 41 to execute a judgment on the basis of signals from the power source detecting means 40, shut-off switch 17, and photo sensitive device 34; a buzzer driving circuit 42 to which an output of the judging circuit 41 is input; and the buzzer 38. The judging circuit 41 comprises: an OR circuit 41a which outputs a high-level signal when either one of (1) the signal which is output from the power source detecting means 40 when the power source was shut off and (2) the signal which is output from the shut-off switch 17 when the cover 6 is in its closed position is input therein; and an AND circuit 41b which outputs a high-level signal when both of (1) the high-level signal from the OR circuit 41a and (2) the high-level signal based on the ON signal of the photo sensitive device 34 are input therein. When the high-level signal is output from the AND circuit 41b, the buzzer driving circuit 42 actuates the buzzer 38.

The buzzer 38 is not actuated when the power source is shut off or the cover 6 is moved to its closed position and the input pen 14 has been received in the pen receptacle 23. However, the buzzer 38 is actuated when the power source is shut off or the cover 6 is closed and the input pen 14 is not received in the pen receptacle 23. Thus, the buzzer 38 serves to issue a warning signal that the input pen 14 is not received in the pen receptacle 23 wherein power to the tablet is shut off either via actuation of the switch 16 or closure of the cover 6.

The light emitting device 32 and the photo sensitive device 34 can be also directly attached to the projecting portion 27 of the pen receptacle 23.

Figure 7A:
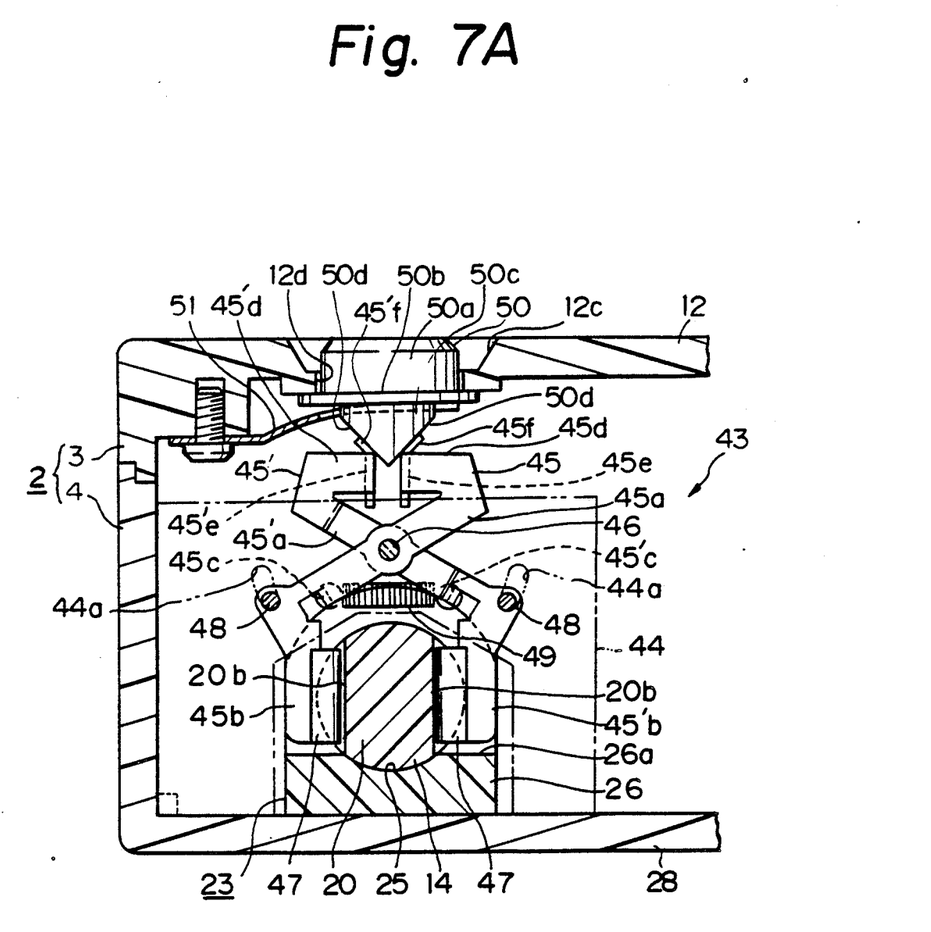
FIG. 7A is an enlarged cross-sectional view taken along the line VII—VII in FIG. 3 illustrating a pen locking mechanism in a locked state.
Figure 7B:
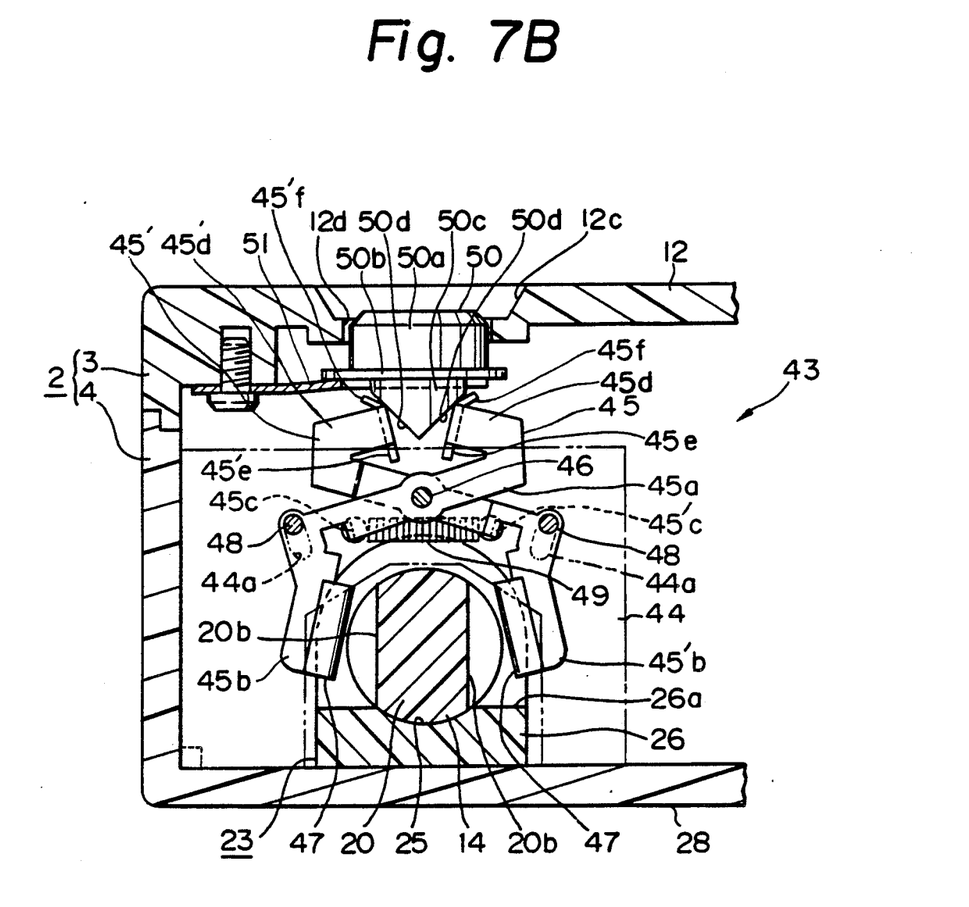
FIG. 7B is an enlarged cross-sectional view taken along the line VII—VII in FIG. 3 illustrating the locking mechanism of FIG. 7A in a released or unlocked state.

FIGS. 7A and 7B illustrate a locking mechanism 43 for the pen 14. The locking mechanism 43 serves to releasably secure the input pen 14 within the pen receptacle 23.

Reference numeral 44 denotes a chassis serving as a base portion of the locking mechanism 43. The chassis 44 has an almost gate-like shape when it is viewed from the right or left direction and is disposed so as to ride over the pen receptacle 23 at the position where the notch 26a is formed. The chassis 44 is secured to the bottom surface wall 28 or the like of the lower half 4.

Reference numerals 45 and 45' denote spring loaded locking levers which are rotatably supported on a supporting shaft 46 which projects leftwardly toward the chassis 44. The shaft 46 projects through central portions of intermediate members 45a and 45'a which mutually cross to form an X-character pattern when they are viewed from the right or left direction. Lower members 44b and 45'b which extend in an almost vertical direction are located so as to face each other in the front or rear direction through the hole 52 of the pen receptacle 23. engaging members 47 preferably made of a synthetic resin are attached to the oppositely facing side edge portions of the lower members 44b and 45'b, which engaging member 47 engage the grooves 20b of the pen 14 when it is received within the receptacle 23.

Pins 48, which serve to restrict movement of the levers 45 and 45', project rightwardly from the upper edge portions of the lower members 44b and 45'b. The right edge portions of the pins 48 are slidably engaged within long restricting holes 44a formed in the chassis 44. Opposite ends of a tension spring 49 are respectively secured on spring hook portions 45c and 45'c formed on lower ends of the intermediate members 45a and 45'a closest to the members 44b and 45'b.

Camming members 45e and 45'e are formed in the edge portions of upper members 45d and 45°d which project from the upper edge portions of the intermediate members 45a and 45°a in such a direction that they mutually approach. As illustrated, the camming members 45e and 45'e include portions 45f and 45'f (hereinafter referred to as "portions to be pressed") which project upwardly and outwardly from the upper members 45d and 45'd so as to have an almost V-like shape.

A rotating force in a direction such that the engaging members 47 mutually approach is applied to the locking levers 45 and 45' by an elastic spring force of the tension spring 49. While the locking levers 45 and 45' are not pressed in the direction opposite to the direction of such a rotating force, as shown in FIG. 7A, the pins 48 come into contact with the lower edges of the long restricting holes 44a, so that the locking levers are held at the locked position at which further rotation sis prevented. In a state in which the locking levers are held in the locked position, the engaging members 47 are located so as to be partially inserted into the hole 25 of the pen enclosing casing 23 and the two portions 45f and 45'f to be pressed are relatively closely positioned.

Reference numeral 50 denotes an unlocking button comprising: a button portion 50a; a radial flange portion 50b which projects radially from a lower edge portion of the button portion 50a; and a pressing portion 50c which projects downwardly from a central portion of the underside of the button 50. The pressing portion 50c has substantially a wedge shape at least when viewed from the right or left direction.

A concave portion or recess 12c and a through hole 12d are formed in the upper surface wall 12 of the upper half 3 at a position in registry with the locking levers 45 and 45'. The button 50 is positioned such that the button portion 50a is inserted into the through hole 12d so as to be slidable therein in the vertical direction. The flange 50b is disposed within the case 2 and prevents the button 50 from complete travel through the hold 12d. A tip portion of a leaf spring member 51 having an almost fork-like shape whose one end portion is fixed to the lower surface of the upper surface wall 12 elastically engages the flange portion 50b from the lower position. Thus, in a state in which the unlocking button 50 is not pressed downwardly, the button 50 is held at the position where the flange portion 50b is pressed against an underside of the lower surface of the upper surface wall 12. The portion of the button portion 50a then protrudes out into the concave portion 12c.

When the upper half 3 and the lower half 4 are joined together, two wedge-shaped oblique surfaces 50d of the pressing portion 50c of the unlocking button 50 come into slight contact with or approach the portions 45f and 45'f of the locking levers 45 and 45'.

When the input pen 14 is inserted into the hole 25 of the pen receptacle 23, the conical portion 20a first comes into contact with the engaging members 47 of the locking levers 45 and 45', and from this position, the input pen 14 moves while individually camming the engaging members 47 outwardly in the front and rear directions. Thus, the locking levers 45 and 45' are rotated against the rotating forces exerted by the tension spring 49 and the engaging members 47 ride over the outer peripheral surface of the main portion 20 of the input pen 14. Then, when the engaging grooves 20b come into registry with the engaging members 47, almost simultaneously with the completion of the insertion of the input pen 14 into the hole 25, the outward camming forces on the locking levers 45 and 45' by the output pen 14 are released and the locking levers 45 and 45' rotate into their locked position. At that time, the engaging members 47 engage engaging grooves 20b.

It can be appreciated that in the locked position, the input pen 14 is prevented from being pulled out of the pen receptacle 23. Therefore, in this state, even if the tablet is disposed in any position, the input pen 14 is not permitted to be pulled out or dropped from the pen receptacle 23, so that there is no fear that the input pen 14 can drop out during transport of the tablet 1.

On the other hand, to remove the input pen 14, the unlocking button 50 is depressed. That is, the unlocking button 50 is pressed downwardly and the pressing portion 50c respectively cams the portions 45f and 45'f of the locking levers 45 and 45' outwardly in almost opposite front and rear directions. As shown in FIG. 7B, the locking levers 45 and 45' are moved to unlocking positions at which the engaging members 47 are moved out of the hole 25 of the pen receptacle 23 and out of engagement with the engaging grooves 20b. Thus, the input pen 14 can be removed from the pen receptacle 23 by pulling out on the right edge portion of the input pen 14 or appropriate downward inclination of the tablet 1.

It is also possible to provide a construction in which a spring is disposed within the pen tip portion of the hole 25 so that the spring becomes compressed when the input pen 14 is placed in the receptacle 23. Then, when the locking mechanism 43 is released, such spring will bias the input pen 14 outwardly from the pen receptacle 23.

Figure 8A:
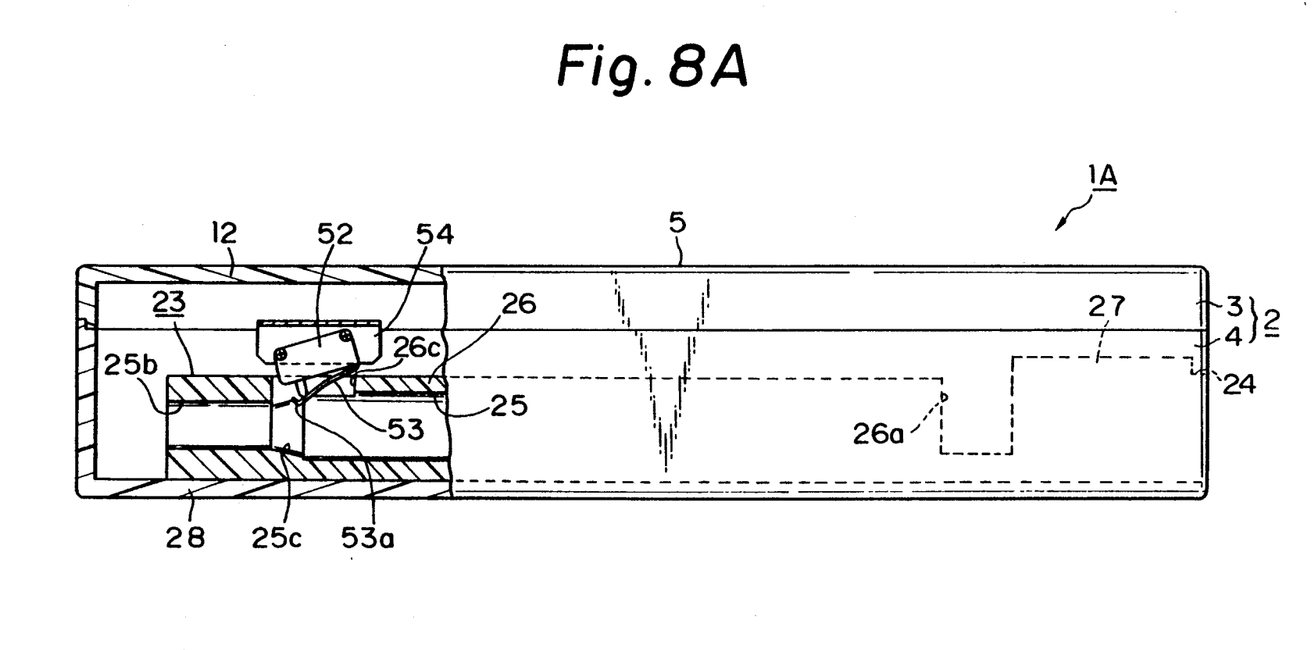
FIG. 8A being a partially broken away front view to illustrate a state in which the input pen is not received in the pen receptacle.
Figure 8B:
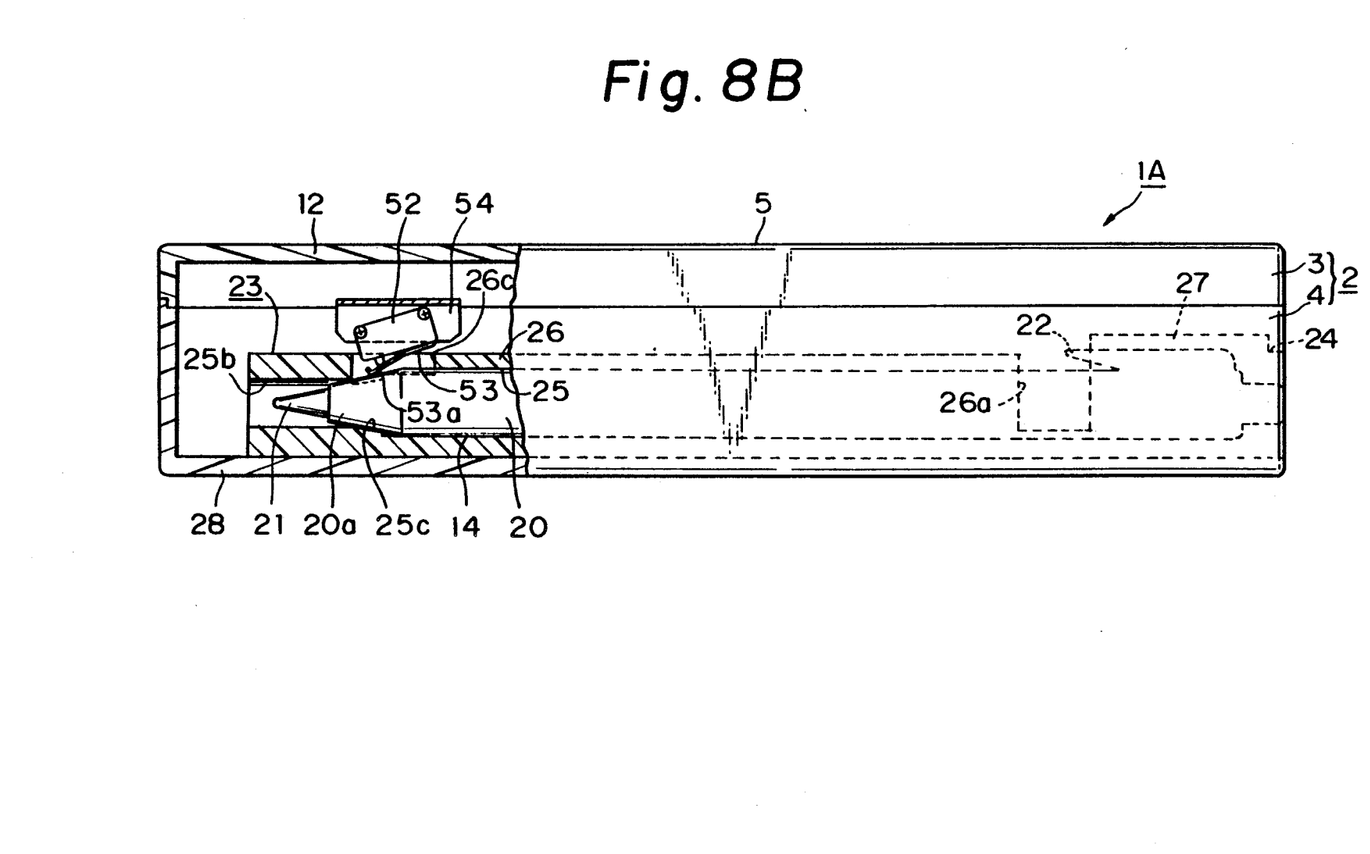
FIG. 8B being a particularly broken away front view illustrating a state in which the input pen is received in the pen receptacle.

FIGS. 8A and 8B illustrate a second tablet 1A embodying principles of the invention.

The tablet 1A differs from the table 1 with respect only to the detecting means for detecting whether the input pen 14 has been received in the pen receptacle 23. Therefore, only the section of interest is illustrated in the drawings. Further, only the above-identified difference will be described and a description of the remaining portions is omitted by designating the respective portions in the drawings by the same reference numerals as those of the similar portions in the first embodiment.

Reference numeral 52 denotes a microswitch having a leaf-type actuator 53. The microswitch 52 is attached to a switch attaching member 54 secured to the lower half 4. A hole 26c is formed at the position corresponding to the taper portion 25c of the hole 25 in the vertex portion of the peripheral wall 26 of the pen receptacle 23. A tip portion 53a of the actuator 53 of the microswitch 52 is located so as project into the hole 25 from the taper portion 25c and through the hole 26c.

The actuator 53 is not pressed when the input pen 14 is not received in the pen receptacle 23. However, when the input pen 14 is received in the pen receptacle 23, as shown in FIG. 8B, the conical portion 20a of the input pen 14 presses against the rotational edge portion 53a of the actuator 53, thereby actuating the switch 52. Consequently, different signals are output by the microswitch 52 depending on whether the input pen 14 is received in the pen receptacle 23.

It can be appreciated that the microswitch 52 can be used in place of the photo interrupter 31 in the warning circuit 39 shown in FIG. 6. It is sufficient that a high-level signal is provided by the microswitch 52 to the AND circuit 51b when the actuator 53 is not pressed.

Figure 9A:
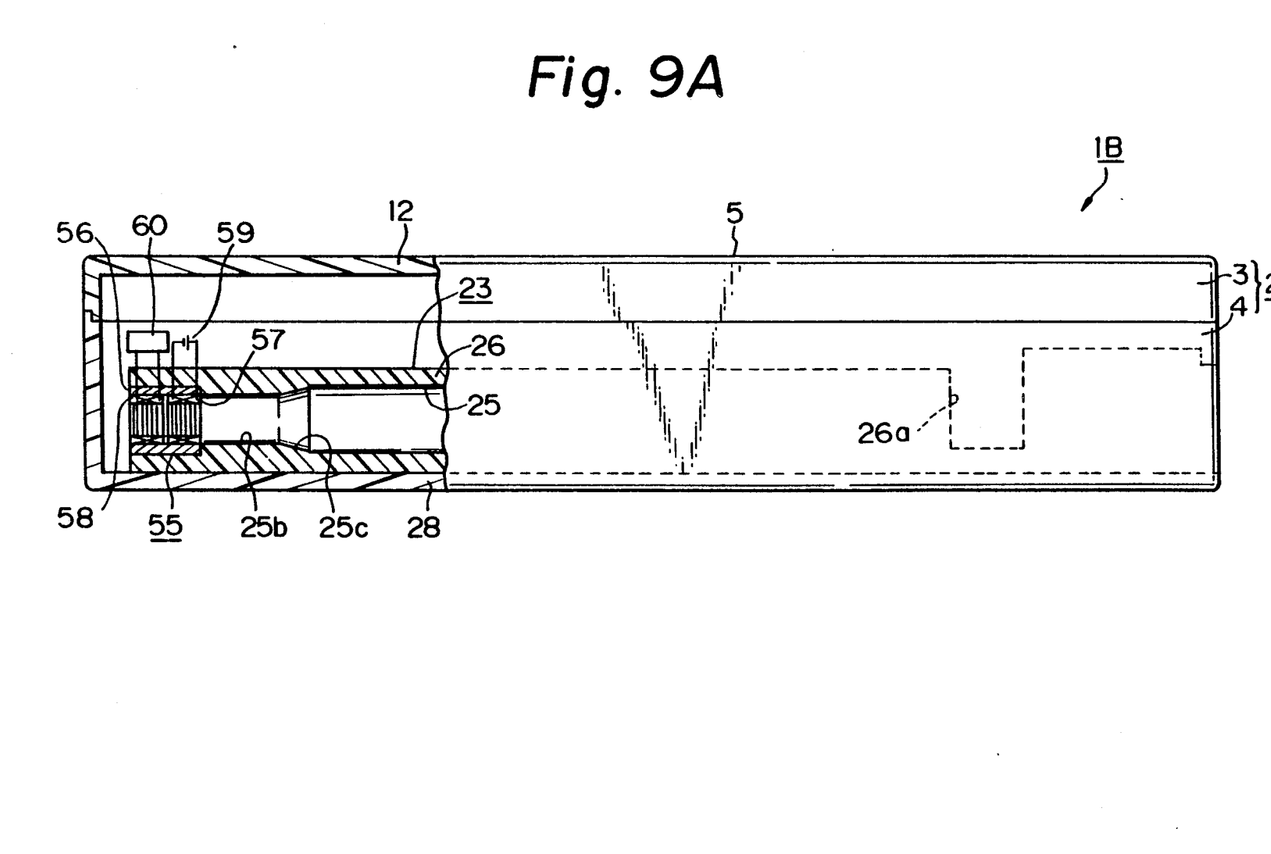
FIG. 9A being a particularly broken away front view illustrating a state in which the input pen is not received in the pen receptacle and FIG. 9B being a partially broken away front view illustrating a state in which the input pen is received in the pen receptacle.
Figure 9B:
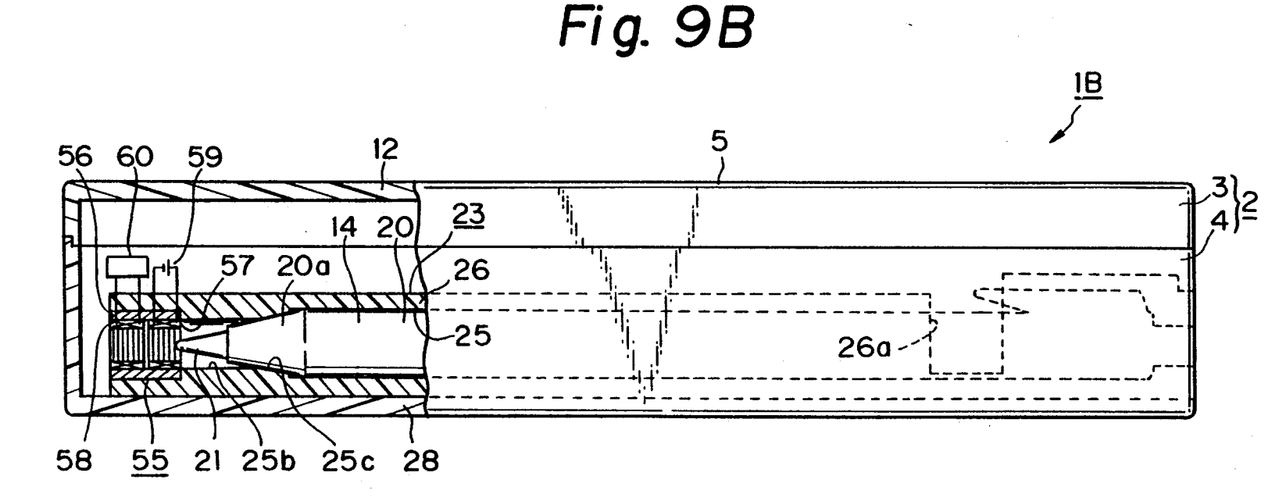

FIGS. 9A and 9B illustrate a third tablet IB also embodying principles of the invention. Again, elements similar to previously described elements are referred to by the same reference numerals and no additional description is provided.

The tablet 1B differs from the tablet 1 with respect only to the detecting means for detecting whether the input pen 14 has been enclosed in the pen receptacle 23.

The detecting means used in tablet IB is suitable for a case where the pen tip 21 of the input pen 14 is made of a permanent magnet, that is, the case where, for instance, an electromagnetic coupling method is used as a method of inputting a handwritten signal via the liquid crystal panel 13.

Reference numeral 55 denotes a coil block comprising two coils 57 and 58 which are arranged on the inner peripheral surface of a cylindrical bobbin 56 so as to be slightly spaced apart from each other in the axial direction. The coil block 55 is fitted into the left edge portion 24b of the hole 25 of the pen receptacle 23.

The right coil 57 of the two coils 57 and 58 is the coil used to generate a magnetic field and the left coil 58 is the coil used for detection purposes. A DC power source 59 is connected to both terminals of the magnetic field generating coil 57. A current detecting device 60 is coupled to the detecting coil 58.

While the input pen 14 is not received in the pen receptacle 23, the magnetic flux generated by the magnetic field generating coil 57 does not change, so that no inductive electromotive force occurs in the detecting coil 58. When the input pen 14 is received into the pen receptacle 23, the edge of the pen tip 21 made of a permanent magnet approaches the magnetic field generating portion coil 57, so that the magnetic flux of the magnetic field generating portion coil 57 changes. Therefore, an inductive electromotive force is generated in the detecting coil 58 that in turn is detected by the current detecting device 60.

Again, it is sufficient that a high-level signal is provided to the AND circuit 41b in the warning circuit 39 when no inductive electromotive force is generated in the detecting coil 58 and that a low-level signal is provided to the AND circuit 41b when an inductive electromotive force is generated in the detecting coil 58.

Therefore, according to the invention, when a user forgets to place the input pen into the pen receptacle following use of the tablet, a warning is generated by the warning means, thereby instructing the user to place the input pen into the pen receptacle so that the loss of the input pen can be effectively prevented. Moreover, there is no need to tether the input pen to the case by cord, a chain, or the like, so that the use of the input pen is not impeded.

The detecting means and the warning means shown in the embodiments have been shown as merely a few examples of devices that can be employed in the invention. The detecting mans and the warning means that can be used in a tablet of the invention are not limited to them.

While preferred embodiments have been shown, modifications and changes may become apparent to those skilled in the art which shall fall within the spirit and scope of the invention. It is intended that such modifications and changes be covered by the attached claims.

We claim:

1. An electronic tablet which receives handwritten information via an input pen including a receptacle for the pen and a detector operative to detect the presence of the pen in the receptacle.

2. The electronic table of claim 1, further including a signal generator coupled to the detector and operative to generate a signal when the pen is not received within the receptacle.

3. The electronic tablet of claim 1, further including a power source detector operative to detect provisions of operating power to the tablet.

4. The electronic tablet of claim 2, wherein said signal generator is operative to signal absence of the pen from its receptacle when operational power is not provided to the tablet.

5. The electronic tablet of claim 1, further including a cover which moves between closed and opened positions and a switch operatively disposed to detect closure of said cover.

6. The electronic tablet of claim 5, further including a signal generator operative to generate a warning signal when the cover in its closed position and the detector does not detect the presence of the pen in the receptacle.

7. An electronic tablet comprising:
a housing;
a combination display and input surface;
an untethered pen used to input handwritten information via the display and input surface;
a receptacle disposed with the housing within which is releasably received the pen;
a pen detector operatively associated with the receptacle that detects the absence of the pen in the receptacle;
a power detector operative to detect non-provision of operational power to the tablet; and
a warning signal generator operatively coupled to the power detector and pen detector that generates a warning signal when non-provision of operating power to the tablet and absence of the pen from the receptacle are concurrently detected.

8. The electronic tablet of claim 7, wherein said housing comprises substantially a rectangular box at one face of which is disposed said display and input surface.

9. The electronic tablet of claim 8, further comprising a cover hingedly secured along one edge of said housing and operative to move between open and closed positions, said cover overlying said display and input surface when in its closed position.

10. The electronic tablet of claim 9, further comprising a switch operatively disposed on said face at which is disposed said display and input surface to detect closure of said cover and cut-off provision of operating power to said tablet.

11. The electronic tablet of claim 7, wherein the receptacle includes means for releasably securing the pen in the receptacle.

12. The electronic tablet of claim 10, wherein the receptacle includes means for releasably securing the pen in the receptacle.

13. An electronic tablet, comprising:
a substantially rectangular housing with a top face;
an input/display surface disposed at said top face;
a cover attached to said housing and operative to move between open and closed positions, said cover overlying said input/display surface in its closed position;
an untethered pen used to input handwritten information via said input/display surface;
a receptacle disposed in said housing within which is received said pen; and
a detector associated with the receptacle and operative to detect the absence of the pen from the receptacle.

14. An electronic tablet comprising:
a pen used to input handwritten information into the tablet;
a receptacle within said tablet within which is received said pen; and
means for detecting receipt of said pen within said receptacle.

15. The tablet of claim 14, further comprising means for alerting the user of non-receipt of said pen within said receptacle.

16. The tablet of claim 14, further comprises means for releasably securing said pen within said receptacle.

* * * * *